United States Patent Office 2,878,756
Patented Mar. 24, 1959

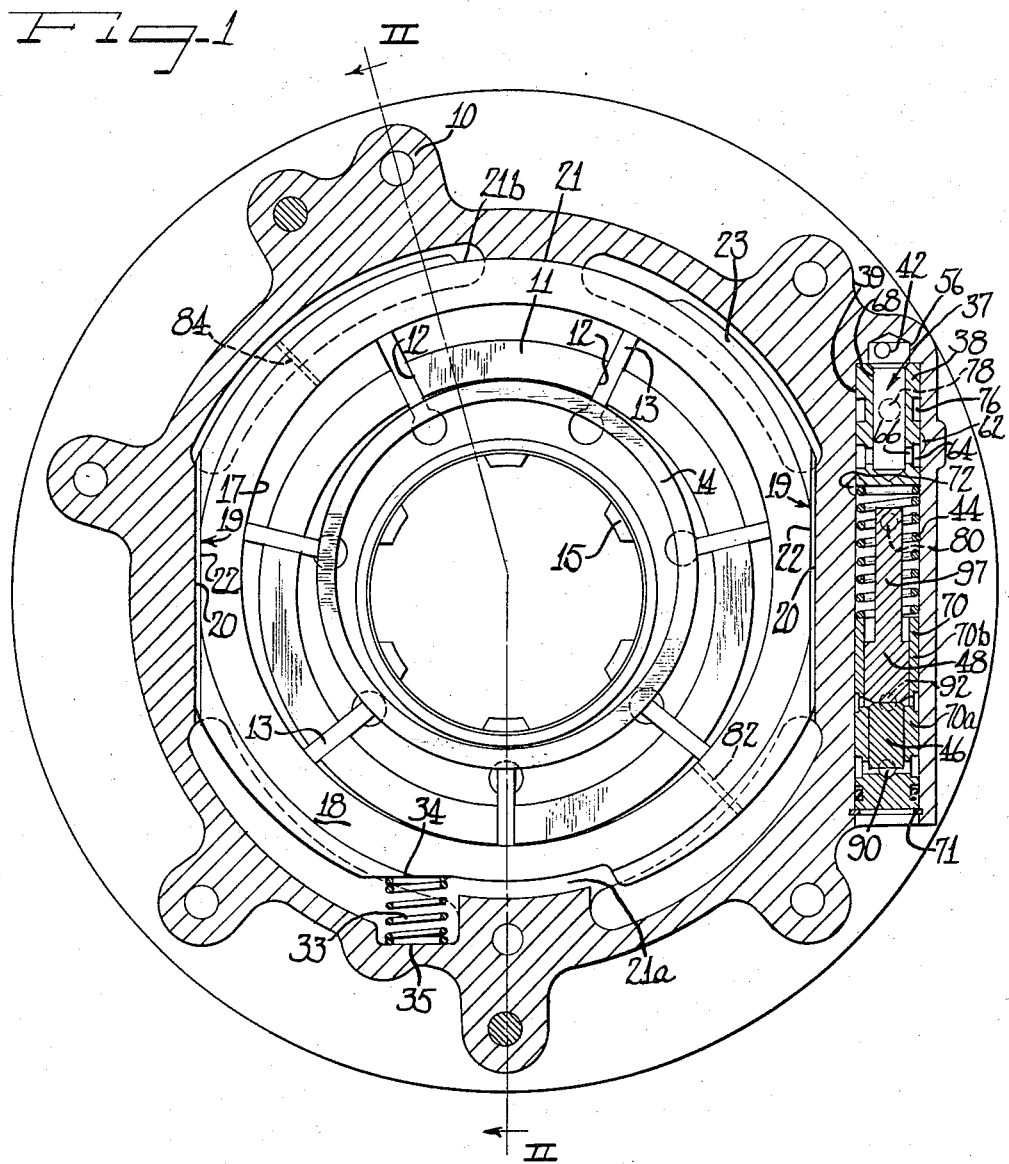

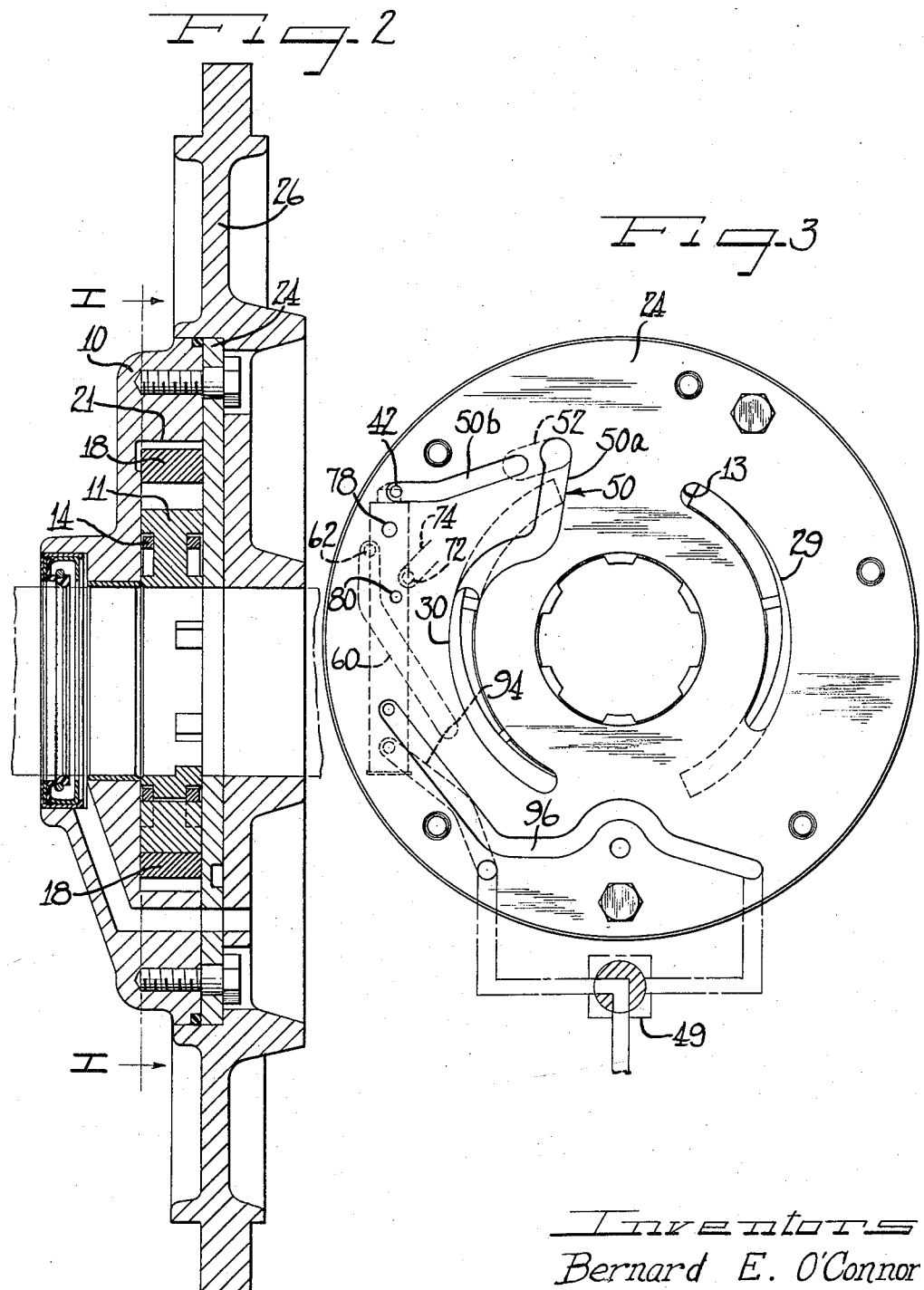

2,878,756

VARIABLE DISPLACEMENT PUMP AND PRESSURE RESPONSIVE CONTROL MEANS THEREFOR

Bernard E. O'Connor, Lake View, and Alfred G. French, Williamsville, N.Y., assignors to Houdaille Industries, Inc., Detroit, Mich., a corporation of Michigan Application August 30, 1955, Serial No. 531,463

13 Claims. (Cl. 103—120)

This invention relates to improvements in variable displacement pumps, and is particularly concerned with novel structure and relationships in such pumps for controlling pump displacement and mean output pressures.

The present application is a continuation-in-part of our copending application Serial No. 161,754, filed May 13, 1950.

With variable displacement pumps of the type adapted for use in the transmission system of an automotive vehicle, it is desired that mean output pressure may be controlled at different levels. Although a single mean output pressure is often sufficient for all forward speeds except low gear, higher pressures are desirably provided to accommodate low gear. Another higher, but different, pressure is desirable for operation of the vehicle in reverse gear. The increased pump pressure is desired for those gears due to an increased engine torque, and that increase in engine torque requires more pressure to various operating bands and clutches in the transmission so that they will not slip under the higher load.

It is accordingly a particular object of the present invention to provide a system by which the displacement and the mean output pressure of a variable displacement pump may be controlled at any of a plurality of selected different pressures.

A further object is to provide such control in response to a single control pressure.

Other objects, features and advantages, such as those set forth in our aforesaid co-pending application, and others of the general improvement of pump controls, will be readily apparent from the following detailed description of a preferred embodiment of our invention, taken in conjunction with the accompanying drawings, in which:

Figure 1 is a vertical section of a variable displacement pump embodying our invention, the section being taken generally on the line I—I of Figure 2;

Figure 2 is a sectional detail taken substantially on the line II—II of Figure 1, and with the pump shown as mounted on a collector ring of an associated automobile transmission; and Figure 3 is an elevational view of the opposite side of the pump from that shown in Figure 1.

By way of illustration, there is shown in the drawings a variable displacement pump of the sliding vane type, and the particular embodiment shown is adapted for use in the transmission system of a automotive vehicle. The pump comprises a casing 10 which houses a pump rotor 11 having a circumferentially spaced series of radial slots 12 within which are operably disposed sliding reciprocable vanes 13. Rings 14 are carried in annular grooves on both sides of the rotor to maintain the outer ends of the vanes on a predetermined diameter. Spline teeth 15 are provided on the rotor for fixing the rotor upon a correspondingly splined shaft in a transmission assembly with which the pump is associated.

A circular pump chamber 17 which is adapted to be engaged by the outer tips of the vanes 13 is provided by a displacement control member or modulator 18 carried in a ring-like portion of the casing 10. The modulator 18 shown is of the reciprocably guided type having opposite parallel flat sides or edges 19 slidably engaging parallel bearing walls 20 defining opposite sides of a modulator control chamber 21 provided by the casing 10 in the general plane of the rotor 11.

For providing a restricted communication between the opposite ends of modulator control chamber 21, means are desirably provided such as a chamfer 22 provided along a corner of each modulator side 19. Outer portions of the modulator 18 are shown as provided with a relief such as the recesses 23 in one of its side faces, and as shown it is the recesses 23 into which the passages provided by chamfers 22 open.

A plate 24 is bolted to the casing 10 to complete a housing in which the pump is enclosed, and more particularly affording closure for the pump chamber 17 and the modulator chamber 21. As shown, the casing 10 with its closure plate 24 is bolted to a collector ring 26 of an associated automatic transmission.

Rotation of the rotor 11 in operation is intended to be counter-clockwise as viewed in Figure 3 so that hydraulic fluid from any appropriate source is drawn through arcuate inlet ducts or ports 29 by action of the rotor blades 13 at the low pressure side of the pump and displaced through outlet ducts or ports 30 at the high pressure side of the pump.

At the beginning of operation, at least, it is desirable that the pump displacement be at a maximum, and for this purpose the modulator 18 is preferably primed or biased to dispose the pump chamber 17 in maximum eccentric pumping relation to the rotor 11 by a spring 33 as shown, one end of which bears against a spring-seat portion 34 at one end of the modulator and the other end of which is received in and bears against a socket-like recess 35 in the wall of casing 10 which defines the modulator chamber 21.

The principal function of the biasing spring 33, which may be of relatively light weight and which need not be of any critical load or compression strength, is to assure that the modulator 18 will normally be, at least at the beginning of operation, in a position of pump chamber eccentricity with respect to the pump rotor 11. As a result, when the pump is started, maximum displacement will occur.

The present application particularly concerns the means which are provided for automatically adjusting the modulator 18 to vary displacement of the pump in operation to maintain predetermined mean output pressures. This is accomplished by the provision of a pressure-responsive, automatically adjustable control valve structure 37 operable to control the application of pump-created pressure for directly adjusting the position of the modulator 18 within the modulator chamber 21 for establishing and maintaining such a relationship of the pump chamber 17 to the pump rotor 11 that even using a constant control pressure a plurality of selected mean pump output pressures may be maintained as desired.

As shown, the control valve assembly 37 includes a movable body such as the reciprocable plunger valve member 38 operatively slidably disposed within a bore 39 in the pump housing. By means yet to be described, pressure fluid is supplied to selected portions of the control valve assembly through cored grooves and passages of the casing 10, transmission collector ring 26, plate 24, and valve body 38 to control the effective pump displacement and thereby the mean output pump pressure at any selected level over a wide range.

According to the present invention, pump output pressure is communicated to the control assembly 37 through a port 42 at the head end of the valve plunger 38, which tends to push the plunger 38 downwardly in Figure 1. Resisting downward movement of that plunger 38 is a spring 44, and selectively actuatably resistance means including a plurality of pressure-responsive plungers such as the auxiliary booster pistons 46 and 48 to which pressure is adapted to be applied. As will be described, by selectively applying pump line pressure to either piston 46—48, or by blocking it from them, a plurality of mean pump output pressures may be obtained as desired. The control means indicated diagrammatically at 49, for selectively applying pressure to the booster pistons 46—48, may be any desired means, preferably responsive to position of the shift selector lever of the vehicle. Such arrangement positions the parts to provide the desired values of pressure with reference to the demand of the gear in which the vehicle is shifted.

The pump output pressure is shown as applied at the head end of the valve plunger 38 by the following means: Provided in the plate 24, and communicating with the pump outlet port 30 in that plate, is a groove 50, the portions 50a and 50b of which, via a cored passage 52 in the juxtaposed surface of the collector ring 26, lead to the port 42 provided in casing 10 and opening into an extension 56 of the head end of the valve bore 39. Since during acceleration of the pump at the beginning of operation or during operation at lower than the desired mean output pressure, it is desirable to have that pressure rise as rapidly as possible to the mean output pressure desired, the means provided assure that the pump displacement of the modulator 18 is such that in its initial operation the pump pressure will increase. Such means includes the modulator biasing spring 33, described above, which acts against the casing 10 to urge the modulator 18 towards eccentricity needed for the sliding vanes 13 to effectuate a pumping action with maximum displacement. To assist spring 33 in urging eccentricity of the modulator 18, hydraulic means are also provided. These hydraulic means as shown comprise a groove 60 carried by the plate 24 and communicating a subchamber 21a of the modulator chamber 21 at the priming end of the modulator, that is, the end of modulator 18 at which the modulator spring 33 is carried, with a port 62 opening into the valve bore 39. The port 62 is so located along bore 39 that it communicates with an annular groove 64 provided in the valve plunger 38, when the plunger is in its upper position, as shown in Figure 1, at positions corresponding to low output pressure. Radial openings 66 communicate the groove 64 with the hollow interior core 68 of the valve plunger 38, which interior core 68 is open to pump output pressure by means of port 42 described above. Thus, by means of port 42, valve plunger core 68, grooves 66 and 64, port 62, and groove 60, pump pressure communicates with the modulator chamber 21a to assist modulator spring 33 in biasing the modulator towards eccentricity and effectual pumping.

All the while, of course, pump output pressure at the head end of valve chamber 37 is urging the plunger 38 downwardly.

To bias the plunger upwardly in Fig. 1 in opposition to pump pressure, is the coiled compression spring 44, one end of which is shown as abutting plunger 38 and the other end of which seats on a sleeve 70 held with respect to the valve assembly as by a C-ring 71. As more fully described in our aforesaid co-pending parent application, the spring 44 is selected both as to length and load resistance qualities to resist movement of the valve plunger 38 with a predetermined force. Thus, until the dynamic pressure of the pump-impelled fluid attains a force in excess of the spring loading, the plunger 38 will be maintained in its upwardly biased position. In that position, as stated above, pump pressure acts through the uncovered port 62 to bias the modulator to eccentricity for effectual pumping.

The relationship of the biasing spring 44 to the valve plunger 38 is such that when a mean pump output pressure value is exceeded, the pump pressure acting upon the head of the plunger will have driven the plunger in opposition to the spring an amount sufficient to close off the port 62 which leads to modulator chamber 21a, and to effect communication between the high pressure above plunger 38 with a sub-chamber 21b at the end of the modulator opposite the spring 33, to tend to shift the modulator 18 in a direction towards concentricity to reduce pump displacement and return to the mean output pressure desired to be maintained. For this purpose, opening into the valve bore 39 there is provided a port 72, which opens into a groove 74 provided in plate 24 and communicating with the modulator chamber 21b opposite chamber 21a. The port 72 is so located along the valve bore 39 that it will register with annular groove 64 of the valve plunger 38 when pump pressure above that plunger has exceeded the load of spring 44 an amount sufficient to permit port 62 to be out of registry with groove 64. When port 72 thus does register with groove 64, the pump pressure as supplied through the opening 42, plunger core 68, grooves 66 and 64, communicates through port 72 and groove 74 to modulation chamber 21b, where it acts on modulator 18 to move it toward concentricity to reduce the pump displacement and hence adjust the pump output pressure.

For venting modulator chamber 21a, or otherwise communicating it with a source of low pressure, so as to bleed off the high pressure to which it was initially subjected through port 62, to assist the high pressure in chamber 21b in moving the modulator toward concentricity, the plunger is provided with another annular groove 76. Moreover, the bore 39 of the valve assembly is provided with a port 78 leading to the transmission sump, pump inlet passage, or other low pressure chamber, and the plunger groove 76 is so proportioned that it bridges across port 78 and port 62 when pressure on the plunger 38 has exceeded its bias. This vents the modulator chamber 21a, through port 62, groove 76, and port 78.

When the pump output pressure has dropped down to or slightly below the desired level, it is no longer sufficient to overcome the bias of spring 44. Hence, the spring acts against the plunger 38, moving it once more upwardly in Figure 1, closing the vent communication through ports 62 and 78, opening pressure communication from valve core 68 through port 62, and closing the pressure communicating to ports 72 from the valve core 68. In the upwardly-biased position of plunger 38, the port 72 is in communication with the rear side of plunger 38, which results in the venting through port 72 the high pressure to which modulator chamber 21b had been subjected in the step of moving the modulator 18 toward concentricity. That port 72 thereby vents by way of the bore 39 of valve assembly 37 below the plunger 38, to a port 80 in the bore 39. Port 80, like port 78 described above, communicates with a low pressure source, such as a pump inlet passage or the transmission sump. Thus subsequent movement of the modulator 18 towards eccentricity to again raise the output pressure is assisted by venting of the modulator chamber 21b through port 72 and port 80.

The presence of port 80 below valve plunger 38 in a position such that it is always uncovered by the plunger 38, and hence always communicates the lower portion of the valve assembly bore 39 to low pressure, is desirable in that any high pressure which may leak into the chamber below plunger 38, as around plunger 38 or by the booster pistons arrangement now to be described, will be quickly dissipated through that port 80 and will be ineffective to cause an undesirable pressure build up or lock below the plunger 38.

For improved stability of operation, as shown, the arrangement also includes bleed passages 82—84 respectively communicating the modulator chamber 21a with the high pressure side of the pump, and communicating the opposite modulating chamber 21b with the low pressure side of the pump. Such bleed passages provide a hydraulic force tending to move the modulator in the direction of full eccentricity, as more fully explained in our co-pending application, Serial No. 202,613, filed December 26, 1950, now Patent No. 2,742,861, to beneficially affect stability of the system by increasing the bias on the control valve.

Means are provided for using pressure liquid to change the effective bias of the spring to effect different selected biasing forces, and thereby different mean pump output pressures. As here shown, such means assist the bias of the valve spring 44 to give different selected mean output pressures with a single control pressure. To this end, we have provided the plurality of booster pistons 46 and 48, arranged in a longitudinal series axially in the bore 39 of the valve assembly 37. Adjacent to the faces of those pistons, ports 90 and 92 open into the valve bore 39. The ports 90—92 open respectively into grooves 94 and 96 provided in the casing 10 and the plate 24, respectively. Those grooves 94 and 96 are adapted to be brought into communication with an associated source of high pressure through an associated selector assembly means, indicated diagrammatically at 49, such as the shift selector lever of the vehicle.

The high pressure source may be the output of the pump itself or auxiliary means carried by the vehicle. The desired arrangement is such that either of grooves 94—96 may be selectively associated with the high pressure source. This in turn selectively admits high pressure through the associated port 90—92 to either selected one of the booster pistons 46—48. Those booster pistons, freely slidable with respect to spring 44, slide respectively in portions 70a and 70b of the sleeve 70 against which the valve biasing spring 44 abuts, and, as by thrust sustainable means such as including stem 97 extending through spring 44, are adapted to engage the adjacent end of the plunger 38 to oppose downward thrust of that plunger occasioned by the pump pressure acting above it.

The effective areas of the several booster pistons 46—48 are different. This provides that a single pressure of control liquid will be effective on one of those booster pistons to yield a biasing force different from the biasing force yielded by the other of the booster pistons, even with the same value of the pressure of the control fluid. Different selected mean pump output pressures may thereby be obtained by use of a constant pressure control liquid, merely by admitting the pressure liquid to a selected one of the grooves 94—96. Co-ordinated with the different areas of pistons 46—48, the surrounding walls of the sleeve portions 70a and 70b in which the pistons slide are provided in a stepped arrangement providing the desired different diameters.

The invention herein disclosed is of particular advantage in hydraulic transmissions for vehicles, for ordinarily at all forward speeds except low gear, a single mean pump output pressure is sufficient. This ordinarily can be obtained by the spring 44. However, low gear for a vehicle ordinarily demands a somewhat higher mean pump output pressure. In this instance, the associated control means 49 is adjusted to communicate groove 94 with a high pressure source, thereby actuating the booster piston 46, and obtaining a higher mean pump output pressure as desired. For reverse gear, a different higher mean pump output pressure is desired. To this end, and desirably by means 49 linked with the mechanism by which the vehicle is shifted into reverse gear, the groove 96 is brought into communication with the high pressure source. This accordingly actuates booster piston 48 to cooperate with the spring 44 to effectuate the desired mean output pressure for operation of the vehicle in reverse gear.

It is readily seen that by metering or controlling the pressure between a value of zero and line pressure to the booster pistons, the pump discharge pressure can be controlled at any pressure between that governed by the spring 44 and that governed by the area of the smallest diameter booster piston 46. Also, it is readily seen that by metering the pressure to the booster piston having the next higher effective area, the pump discharge pressure can be controlled on up to that governed by that next larger booster piston 48.

It will thus be seen from the foregoing description of our invention according to a preferred embodiment, considered in conjunction with the drawings, that the present invention provides a new and improved variable displacement pump and pressure responsive control means therefor, having the desired advantages and characteristics, particularly that of a plurality of selected mean output pressures, and accomplishing its intended objects, including those hereinbefore pointed out and others which are inherent in the invention as described.

It will be understood that modifications and variations may be effected without departing from the scope of the novel concepts of the present invention.

We claim as our invention:

1. In combination in means for controlling a variable displacement pump wherein a modulator in a chamber is adjustable in the chamber relative to a pump rotor to vary displacement responsive to pump-created pressure directed through passages from the pump to the modulator chamber, a housing structure having a valve chamber therein including means for communication with said passages, a reciprocable valve body in said valve chamber adapted to be responsive to pump pressure to move in one direction, and means for biasing the valve body in the opposite direction in opposition to pump pressure including a biasing spring and a plurality of pressure-responsive auxiliary plungers operatively movable relative to the spring and active selectively in supplement to the spring to bias the valve body in said opposite direction, said plungers each having a different effective area to provide different values of valve bias in response to a single value of pressure by which they are actuated.

2. In combination in control means for a variable displacement pump wherein a casing has a reciprocable modulator providing a pump chamber and a pump rotor operates in the chamber with said modulator and said casing related at the opposite ends of the modulator to define pressure chamber spaces while inlet and outlet ports in the casing respectively communicate in operative relation with said pump chamber and respective fluid passageways provided by the casing communicate with said control chamber spaces, a plunger valve housing defining a valve chamber having respective ports for communication with said passageways, a plunger valve in said housing for selectively controlling fluid flow through said ports and thereby through the respective passageways, means at one end of the valve normally biasing the valve in one direction, said housing having a passage communicating with the outlet port of the pump to subject the opposite end of said plunger valve to high pressure from the pump in opposition to said biasing means for modifying the position of the valve and to supply said passageways through said ports as selected by the valve with high pressure fluid from the pump, said biasing means including at least two biasing plungers having differing effective areas normally free floating and reciprocably movable with respect to said one end of the plunger valve, and means for selectively applying a driving force to each said biasing plunger effective to obtain differing forces of bias of said plunger valve.

3. In a variable displacement pump construction, a casing ring defining a modulator chamber, a modulator ring member in said chamber and cooperating at diametrically opposite sides with the wall of said ring defined chamber to divide the space in said chamber into opposite subchambers at respective diametrically opposite sides of the modulator between said first mentioned diametrically opposite sides, said modulator having therein a pump chamber within which a pump rotor and fluid impelling means are adapted to operate, casing structure enclosing the opposite faces of said casing ring and the periphery of said casing ring, respective fluid inlet and outlet ports communicating through said casing structure with the pump chamber, said casing structure having a valve chamber therein, said casing structure having a passage leading from one of said sub-chambers to said valve chamber, said casing ring and said casing structure having a fluid passage leading to said valve chamber from the other of said sub-chambers, said casing structure having a further passage leading to said valve chamber from said outlet port, a valve member in said valve chamber responsive to fluid pressure through said further passage to control the flow of pressure fluid from said further passage through said valve chamber into selectively the passages from said sub-chambers, and means including a plurality of biasing plungers in said valve chamber selectively actuatable to bias at different forces said valve member to make it selectively responsive to different fluid pressures in said further passage.

4. In combination in a variable displacement pump, a casing defining a modulator chamber, a modulator adjustably movable in said chamber and cooperating with the walls defining said chamber to divide the modulator chamber into sub-chambers at respectively substantially diametrically opposite ends of the modulator, the modulator having therein a pump chamber, a pump rotor operable in said pump chamber and having means cooperating with the wall of the modulator defining the chamber to displace fluid through the pump chamber, fluid inlet and outlet ports communicating with the pump chamber, and means for controlling the position of the modulator in said modulator chamber comprising: a valve chamber provided by the casing, respective passages leading from said sub-chambers to said valve chamber, a further passage leading from said outlet port to the valve chamber, a plunger valve reciprocable in said valve chamber and operable responsive to fluid pressure communicated through said further passage to control delivery of pressure fluid from said further passage through said valve chamber selectively to said passages that communicate with said sub-chambers, a spring normally biasing said valve plunger in opposition to the pressure of fluid delivered through said further passage, thrust-sustainable means operatively extending from said valve plunger past said spring, a plurality of reciprocable plungers independent of the spring and reciprocable relative to the valve plunger but disposed in thrusting relation to said plunger, and means for subjecting either of the reciprocable plungers selectively to fluid pressure to drive it into thrusting relation to said thrust-sustainable means for supplementing the bias of the spring in opposing pressure from the pump through said further passage, whereby to selectively increase the bias load that must be overcome before the valve plunger will shift in opposition to the spring, the reciprocable plungers varying in effective area one from another to provide different supplementing bias forces.

5. In combination in control means for a variable displacement pump, a casing having a bore, a control valve plunger in said bore and means for directly subjecting the valve plunger at one end to pressure fluid from the high pressure side of the pump, a spring in said bore operative on the valve plunger in opposition to the high pressure on the valve plunger, thrust-sustainable means operatively extending from the valve plunger past the spring, reduced diameter portions axially arranged in step-wise fashion at the rear end of the bore, an auxiliary pressure plunger in each said reduced diameter portion, said means being operatively thrustingly engageable selectively by each said auxiliary plunger, and means for introducing pressure fluid into the reduced diameter bore behind a selected auxiliary plunger for operatively thrusting said auxiliary plunger against said thrust-sustainable means and thereby supplementing the bias of said spring.

6. In combination in control means for a variable displacement pump assembly of the kind including a pressure sensitive modulator the position of which must be controlled, a pressure responsive control valve comprising a plunger arranged to be exposed at one end to pump pressure, means at the opposite end of the valve plunger for biasing the same in opposition to the pump pressure comprising a coil spring, thrust-sustainable means operatively extending from the said opposite end of the valve plunger extending into the coil spring, and means including a plurality of auxiliary valve biasing plungers selectively operable upon said thrust-sustainable means to supplement the spring bias at differing selected pressure values.

7. In combination in means for controlling a variable displacement pump wherein a modulator in a chamber is adjustable in the chamber relative to a pump rotor to vary displacement responsive to pump-created pressure directed through passages from the pump to the modulator chamber, a housing structure having a valve chamber therein including means for communication with said passages, a reciprocable valve body in said valve chamber adapted to be responsive to pressure developed by said pump to move in one direction, and means for biasing the valve body in the opposite direction in opposition to pressure developed by said pump, said passages including a first passage communicating with said modulator chamber at a point wherein pressure biases said modulator to a condition of relatively high pump displacement, a second passage communicating with said modulator chamber at a point where pressure biases said modulator to a condition of relatively low pump displacement, a third passage leading to an associated source of relatively lower pressure, said valve and chamber being so arranged that at pressures below that at which said bias is overcome a port communicating with said second passage is exposed to a port communicating with said third passage, said valve chamber being provided with a port communicating with a fourth passage and generally adjacent the port which communicates with said first passage, there being annular groove means provided for said valve body whereby when said valve body is at a position assumed when said bias is overcome said groove straddles said generally adjacent ports and thereby communicates said first passage with said fourth passage to relieve pressure in said first passage.

8. In combination in means for controlling a variable displacement pump wherein a modulator in a chamber is adjustable in the chamber relative to a pump rotor to vary displacement responsive to pump-created pressure directed through passages from the pump to the modulator chamber, a housing structure having a valve chamber therein including means for communication with said passages, a reciprocable valve body in said valve chamber adapted to be responsive to pressure developed by said pump to move in one direction, means for biasing the valve body in the opposite direction in opposition to pressure developed by said pump including a biasing spring and a pressure-responsive auxiliary plunger operatively movable relative to the spring and active selectively in supplement to the spring to bias the valve body in said opposite direction, and auxiliary fluid-pressure means cooperating with said plunger for selectively applying forces of selected different values to supplement the bias of said spring.

9. In combination in means for controlling a variable displacement pump wherein a modulator in a chamber is adjustable in the chamber relative to a pump rotor to vary displacement responsive to pump-created pressure directed through passages from the pump to the modulator chamber, a housing structure having a valve chamber therein including means for communication with said passages, a reciprocable valve body in said valve chamber adapted to be responsive to pressure developed by said pump to move in one direction, means for biasing the valve body in the opposite direction in opposition to pressure developed by said pump, said biasing means including cooperating resilient means and a plurality of pressure-responsive plunger means adapted to operatively thrustingly engage said valve body to bias the body in said opposite direction, and control means for said plunger means arranged and adapted to selectively effect different selected operative thrust relationships thereof each operative to produce a different biasing force for opposing with predetermined force movement of said valve body.

10. In combination in means for controlling a variable displacement pump wherein a modulator in a chamber is adjustable in the chamber relative to a pump rotor to vary displacement responsive to pump-created pressure directed through passages from the pump to the modulator chamber, a housing structure having a valve chamber therein including means for communication with said passages, a reciprocable valve body in said valve chamber adapted to be responsive to pressure developed by said pump to move in one direction, means for biasing the valve body in the opposite direction in opposition to pressure developed by said pump, said biasing means including a plurality of pressure-responsive means adapted to operatively thrust toward said valve body to bias the body in said opposite direction, and control means for cooperating with said pressure responsive means to effect a plurality of different operating thrust relationships.

11. In combination in means for controlling a variable displacement pump wherein a modulator in a chamber divides the chamber into sub-chambers is adjustable into the sub-chambers of the chamber relative to a pump rotor to vary displacement responsive to pump-created pressure directed through passages from the pump to the sub-chambers of the modulator chamber, a housing structure having a valve chamber therein including means for communication with said passages, a reciprocable valve body in said valve chamber adapted to be responsive to pressure developed by said pump to move in one direction, and means for biasing the valve body in the opposite direction in opposition to pressure developed by said pump, the side face of said modulator adjacent its periphery being provided with a relief communicating the sub-chambers for stabilizing purposes.

12. In combination in means for controlling a variable displacement pump wherein a modulator in a chamber is adjustable in the chamber relative to a pump rotor to vary displacement responsive to pump-created pressure directed through passages from the pump to the modulator chamber, said chamber including sub-chambers adapted when supplied with pressure to urge said modulator towards a position of relatively high displacement and relatively low displacement, respectively, and restricted passage means on the modulator communicating the two said sub-chambers bypassing said valve, a housing structure having a valve chamber therein including means for communication with said passages, a reciprocable valve body in said valve chamber adapted to be responsive to pressure developed by said pump, to move in one direction, and means for biasing the valve body in the opposite direction in opposition to pressure developed by said pump.

13. In combination in means for controlling a variable displacement pump wherein a modulator in a chamber is adjustable in the chamber relative to a pump rotor to vary displacement responsive to pump-created pressure directed through passages from the pump to the modulator chamber, said chamber including sub-chambers adapted when supplied with pressure to urge said modulator towards a position of relatively high displacement and relatively low displacement, respectively, said modulator being provided with a chamfer along an edge portion thereof extending between the sub-chambers and providing in cooperation with the adjacent chamber wall a restricted passage communicating the two sub-chambers.

References Cited in the file of this patent

UNITED STATES PATENTS

| | | |
|---|---|---|
| 2,635,551 | De Lancey | Apr. 21, 1953 |
| 2,678,607 | Hufferd et al. | May 18, 1954 |
| 2,805,628 | Herndon et al. | Sept. 10, 1957 |